United States Patent
Farahani (10) Patent No.: US 12,342,951 B2
(45) Date of Patent: Jul. 1, 2025

(54) ARTICULATING HOOK APPARATUS FOR HANGING AN ARTICLE FROM A VARIETY OF STRUCTURES

(71) Applicant: Sheila Farahani, Austin, TX (US)

(72) Inventor: Sheila Farahani, Austin, TX (US)

(*) Notice: Subject to any disclaimer, the term of this patent is extended or adjusted under 35 U.S.C. 154(b) by 0 days.

(21) Appl. No.: 18/663,930

(22) Filed: May 14, 2024

(65) Prior Publication Data

US 2024/0298833 A1    Sep. 12, 2024

Related U.S. Application Data (63) Continuation of application No. 17/115,757, filed on Dec. 8, 2020, now abandoned.

(51) Int. Cl.
| | | |
|---|---|---|
| *A47G 29/08* | (2006.01) |
| *A45F 5/10* | (2006.01) |
| *F16M 13/02* | (2006.01) |

(52) U.S. Cl.
CPC .......... *A47G 29/083* (2013.01); *A45F 5/1026* (2013.01); *F16M 13/022* (2013.01); *A45F 2005/1033* (2013.01); *A45F 2005/1066* (2013.01)

(58) Field of Classification Search
CPC ... A47G 29/083; Y10S 248/914; F16B 45/06; F16M 13/022; A45F 5/1026; A45F 2005/1033; A45F 2005/1066
USPC .......................................... 294/169; 248/339
See application file for complete search history.

(56) References Cited

U.S. PATENT DOCUMENTS

| | | |
|---|---|---|
| 3,860,210 A | 1/1975 | Berardinelli |
| 4,118,001 A | 10/1978 | Serkez |
| 7,661,644 B1 | 2/2010 | Yen |
| 7,828,258 B2 | 11/2010 | Shigio |
| 8,061,669 B2 | 11/2011 | Yap et al. |
| 8,083,202 B1 * | 12/2011 | Hutchison ............ A47G 29/083 248/692 |
| 9,439,527 B2 | 9/2016 | Kljajic |
| D847,619 S | 5/2019 | Farahani |
| 2010/0133394 A1 | 6/2010 | Chvetsova |
| 2013/0306823 A1 | 11/2013 | Liu |

FOREIGN PATENT DOCUMENTS

WO    WO-2010037941 A1 *   4/2010   ........... A47G 29/083

* cited by examiner

*Primary Examiner* — Stephen A Vu
(74) *Attorney, Agent, or Firm* — HULSEY P.C.

(57) ABSTRACT

An articulating hook apparatus for hanging an article from a structure includes a housing. The hook apparatus having connectors that extend from the housing. Each of the connectors including a plurality of links that connect pivotally to each other in series. The plurality of links having a starting link and a last link. The starting link connects to respective connectors. The last link connects to an articulating hook. The connectors operate between a retracted position and an extended position. The connectors retract and allow the plurality of links and the hooks to fold adjacent to the perimeter of the housing. The connectors enable both a "J"- and an "S"-shaped configuration.

15 Claims, 7 Drawing Sheets

ARTICULATING HOOK APPARATUS FOR HANGING AN ARTICLE FROM A VARIETY OF STRUCTURES

The present application is a continuation of U.S. Non-Provisional application Ser. No. 17/115,757, filed Dec. 8, 2020; all of which is incorporated herein by reference.

FIELD OF THE DISCLOSURE

The present invention generally relates to hanging accessories. More specifically, the present invention relates to an articulating hook apparatus for hanging an article such as a handbag from a variety of structures such as chairs, tables, door handles, back of the door, etc.

BACKGROUND OF THE DISCLOSURE

Most people, women in particular carry a handbag or purse when they go out, and many men carry a laptop bag or suitcoat in need of hanging. People carry the handbag for storing various items needed for daily use. It is difficult to carry the handbag in public places such as restaurants, or restrooms. As may be known, public places generally lack storage cabinets or space to place the handbag temporarily. Due to lack of storage space and unhygienic nature of public places, people may carry a portable device or hanger to aid them in hanging the handbag. Such a hanger connects to a structure and holds the handbag.

An example of a portable device for hanging a handbag is disclosed in a U.S. Pat. No. 8,061,669, entitled "Portable Hanger" (the "'669 Patent"). The '669 Patent discloses a portable hanger for hanging a purse from a table. The portable hanger includes a base adapted to rest upon and frictionally engage the table. A plurality of links are pivotally linked to each other in series to form a chain having a first link and a last link. A pivot pin pivotally connects the base and the first link of the plurality of links. The plurality of links are adapted for pivot between a stored configuration in which the plurality of links are positioned generally adjacent the perimeter of the base, and an operative configuration in which the plurality of links form an articulating hook adapted for hanging the purse.

Another example similar to '669 Patent is disclosed in a U.S. Pat. No. 7,661,644, entitled "Carry Bag With Edge Swing" (the "644 Patent").

Yet another example of a portable device for hanging a handbag is disclosed in a United States Publication No. 2013/0306823, entitled "Multifunction Bag Hanging Device" (the "'823 Publication"). The '823 Publication discloses a device that is selectably movable between a "clasp" configuration and a "hanger" configuration. The device has a device body, a first spring-biased hinge at a first end of the device body and a second spring-biased hinge at a second end of the device body, a clip hingedly connected to the first end of the body, and an articulating hook hingedly connected to the second end of the body.

The above disclosures have several limitations. For example, the hangers require a flat surface such as a table to rest the base. It may be difficult to find a flat surface in public places. As a result, the hangers disclosed in '669 and '644 Patents and '823 Publication may not be useful unless the user finds a flat surface to hang the handbag. In addition, the '669 Patent includes a locking means for locking the links. The locking means may get stuck with other objects and tear soft articles when placed in the handbag.

Therefore, there is a need for an articulating hook apparatus for hanging articles from a variety of structures having even/flat or uneven surfaces.

BRIEF SUMMARY OF THE DISCLOSURE

It is an object of the present invention to provide an articulating hook apparatus for hanging articles from a variety of structures and that avoids the drawback of known hanging devices.

It is another object of the present invention to provide an articulating hook apparatus for hanging articles from even/planar or uneven surfaces or structures.

It is another object of the present invention to provide an articulating hook apparatus that extends to connect to a structure at one end and receive an article at other end for hanging the article.

It is another object of the present invention to provide an articulating hook apparatus that folds into the housing and reduces the possibility of accidentally hooking other objects.

It is another object of the present invention to provide an articulating hook apparatus that folds around the perimeter of the housing and reduces the possibility of accidentally hooking other objects when carried in a handbag or other similar articles.

It is another object of the present invention to provide an articulating hook apparatus that folds into a compact size for easy carrying and storage.

In order to overcome the limitations here stated, the present invention provides an articulating hook apparatus configured for hanging articles from a variety of structures. The hook apparatus includes a housing having a disk-shape. The housing includes cut sections. The hook apparatus includes two connectors. Each of the connectors extends from respective cut sections. The hook apparatus includes a plurality of links that connect pivotally to one another in series. The plurality of links includes a starting link and a last link. The starting link indicates the first link in the plurality of links. The starting link connects to respective connectors. The last link connects to an articulating hook. The connectors operate between a retracted position and an extended position.

In one embodiment, connectors retract and allow the plurality of links and the hooks to fold within the cut sections. The connectors extend and allow the plurality of links and the hooks to extend. The presently disclosed subject matter enables both a "J"- and an "S"-shaped configuration. In one example, one of the connectors has an end that securely locks to the housing, creating an angle with the link which places the center of mass of the hanging object below the horizontal surface holding the housing, and below the housing itself. This allows the hanging apparatus to support a large mass in a "J"-shaped configuration.

To convert to an S-shaped hook, a person would extend the locked connector to an extended position, thus allowing the plurality of links to rotate in line with the housing. And, the rotation occurs while simultaneously opening or releasing the second hook apparatus, which is oriented 180 degrees from the first hook. This will create an "S"-shaped configuration, where the housing lies flat against the vertical structure, such as a door, with the hook rotated perpendicular to the plane of the housing. This allows one end of the hook to be over the top of the vertical structure or door, with the second hook extending out from the vertical surface to create a hook from which to hang the object.

In another embodiment, the housing includes a smooth perimeter or a circular body. In such embodiment, connectors extend from the perimeter/circular body of the housing. Further, a plurality of links and hooks fold around the perimeter/circular body.

In one embodiment, one connector retracts and allows to fold the links and hook. Other connector extends and allows to extend the links and hook. In the current embodiment, a user may place the housing on a planar surface such as a table. An article hangs from the hook taking support from the housing.

In one advantageous feature of the present invention, a plurality of links and the hooks fold within the cut sections thereby reducing the possibility of accidentally hooking other objects and/or accidentally opening. The hook apparatus folds into a compact size and allows for easy storage and transport.

In another advantageous feature of the present invention, the housing includes a decorative article made of any suitable material such as gold, platinum, enamel, precious stone, etc. The housing could be adorned by a painting, a beautiful scene, or another attractive surface, according to the users preference. Moreover, the housing exterior may even provide an image of a loved one or friend that would be pleasing to the user. There are, thus, many ways the housing exterior may be adorned or form while the resulting structure being clearly within the scope of the presently disclosed and claimed subject matter. This allows the user to use the hook apparatus as a piece of jewellery or decorative accessory.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

The detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed hook apparatus. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed hook apparatus.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of an articulating hook apparatus for hanging an article from a structure, it is to be further understood that numerous changes may arise in the details of the embodiments of the hook apparatus. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

It should be understood that the present invention describes an articulating hook apparatus for hanging an article from a structure. The hook apparatus comprises a housing with two connectors, each extending from the housing. Each of the connectors comprises plurality of links that connect pivotally to each other in series. The plurality of links comprises a starting link and a last link. The starting link connects to respective connectors. The last link connects to an articulating hook. The connectors operate between a retracted position and an extended position.

In one embodiment, the connectors retract and allow the plurality of links and the hooks to fold within the cut sections. The connectors extend and allow the plurality of links and the hooks to extend. The presently disclosed subject matter enables both a "J"- and an "S"-shaped configuration. In one example, one of the connectors has an end that securely locks to the housing, creating an angle with the link which places the center of mass for the hanging object below the horizontal surface holding the housing, and below the housing itself. This allows the hanging apparatus to support a large mass in a "J"-shaped configuration.

To convert to an S-shaped hook, a person would extend the locked connector to an extended position, thus allowing the plurality of links to rotate in line with the housing. And, while simultaneously opening or releasing the second hook apparatus, which is oriented 180 degrees from the first hook. This will create an "S"-shaped configuration, where the housing lies flat against the vertical structure, such as a door, with the hook rotated perpendicular to the plane of the housing. This allows one end of the hook to be over the top of the vertical structure or door, with the second hook extending out from the vertical surface to create a hook from which to hang the object.

In one embodiment, the housing comprises cut sections. Each connector extends from respective cut sections. The connectors retract and allow the links and the hooks to fold within the cut sections.

Various features and embodiments of an articulating hook apparatus for hanging an article from a structure are explained in conjunction with the description of FIGS. 1-8. For example, there could be alternate shapes to the presently disclosed disc, as well, besides a circle. They could be ovoid or rectangular, square etc.

Figure 1:
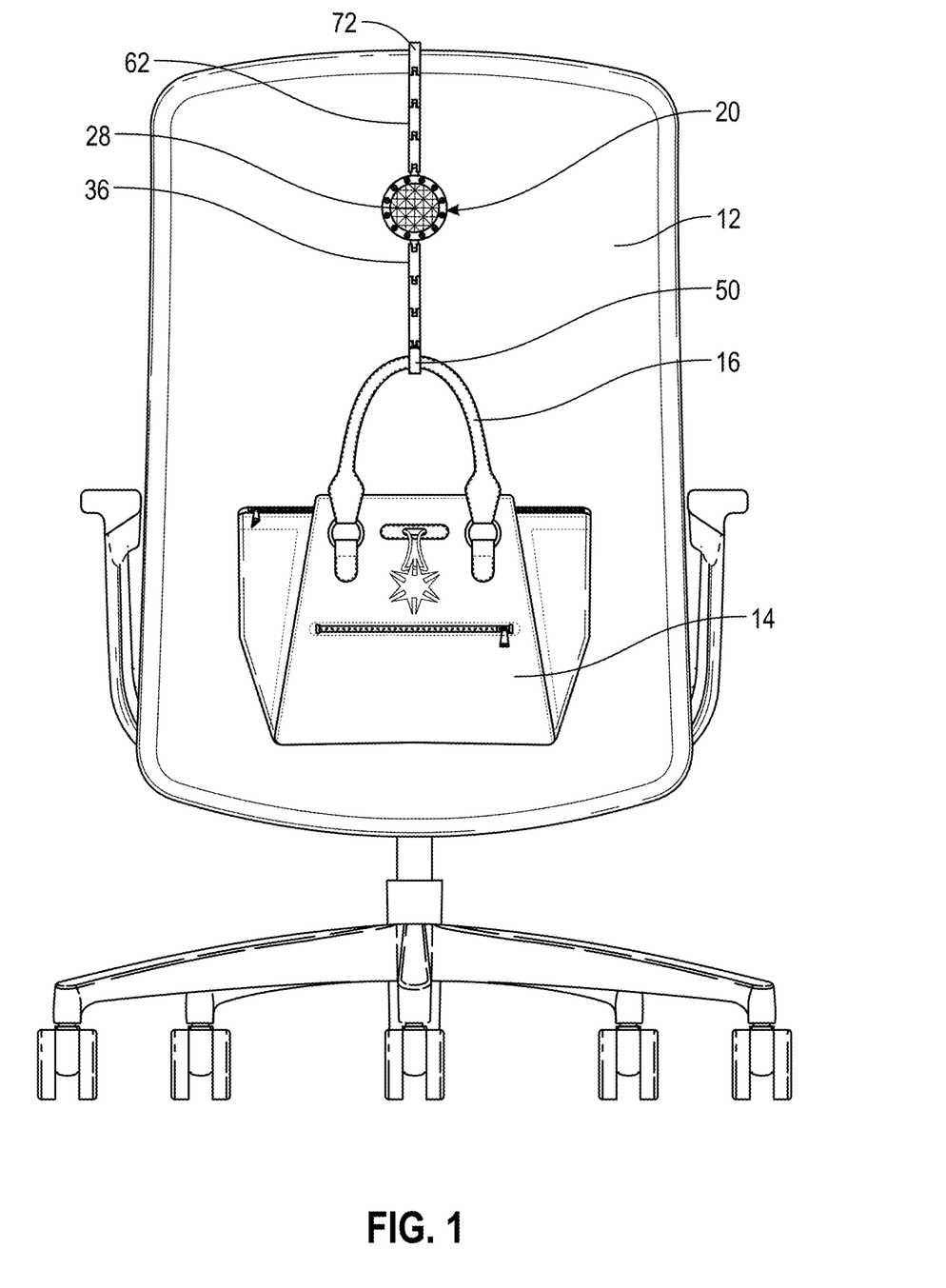
FIG. 1 illustrates an articulating hook apparatus allowing an article to hang from a structure such as a chair, in accordance with one embodiment of the present invention.

In one embodiment, the present invention discloses hook apparatus 10 for hanging articles from a variety of structures. FIG. 1 shows a perspective view of hook apparatus 10 in which one end (second hook 72) of hook apparatus 10 connects to structure 12 and allows other end (first hook 50) to hang an article 14. Article 14 such as a handbag hangs directly or via straps 16 from hook apparatus 10.

Figure 2A:
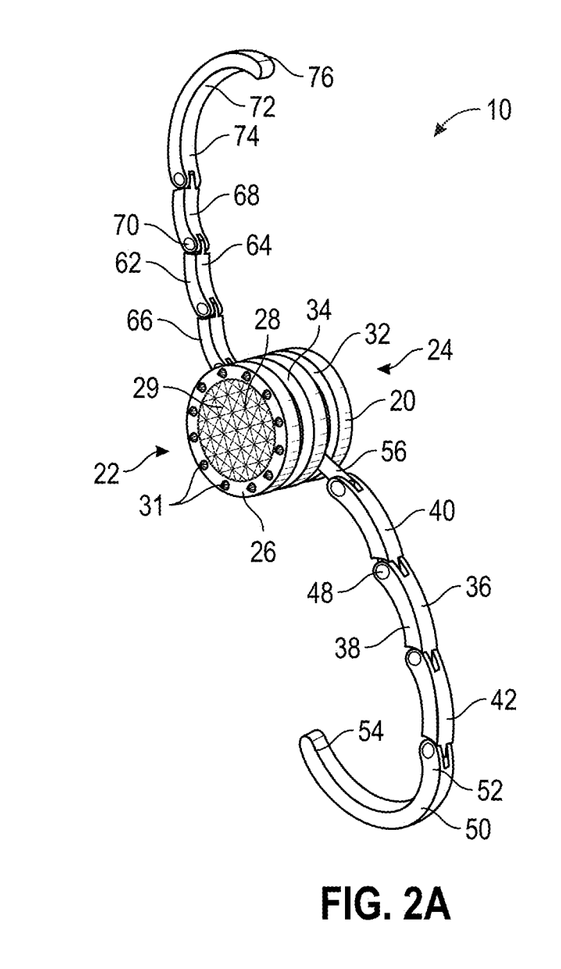
FIGS. 2A through 2C illustrate a perspective, front and side views, respectively of the hook apparatus, in accordance with one embodiment of the present invention.
Figure 2B:
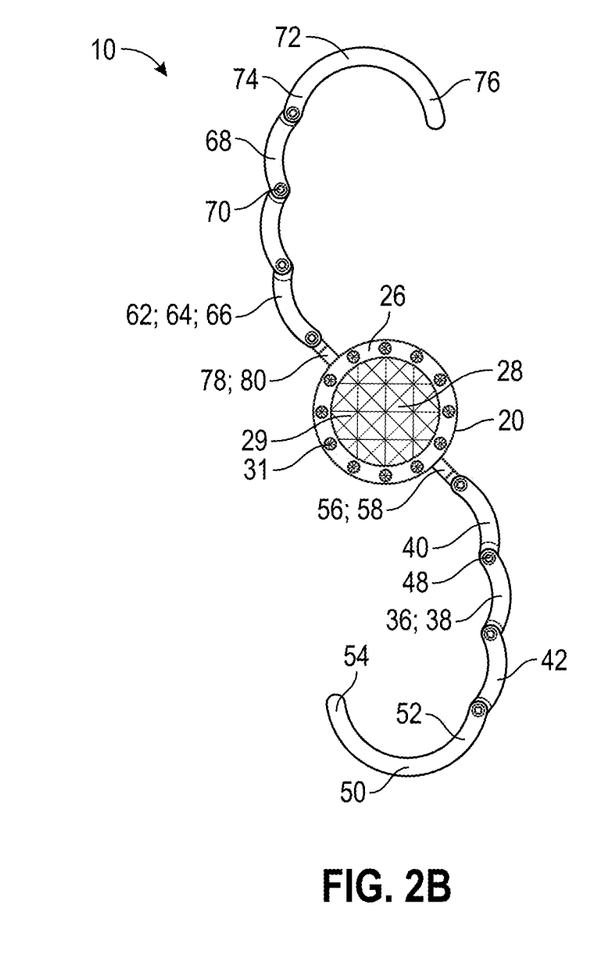
Figure 2C:
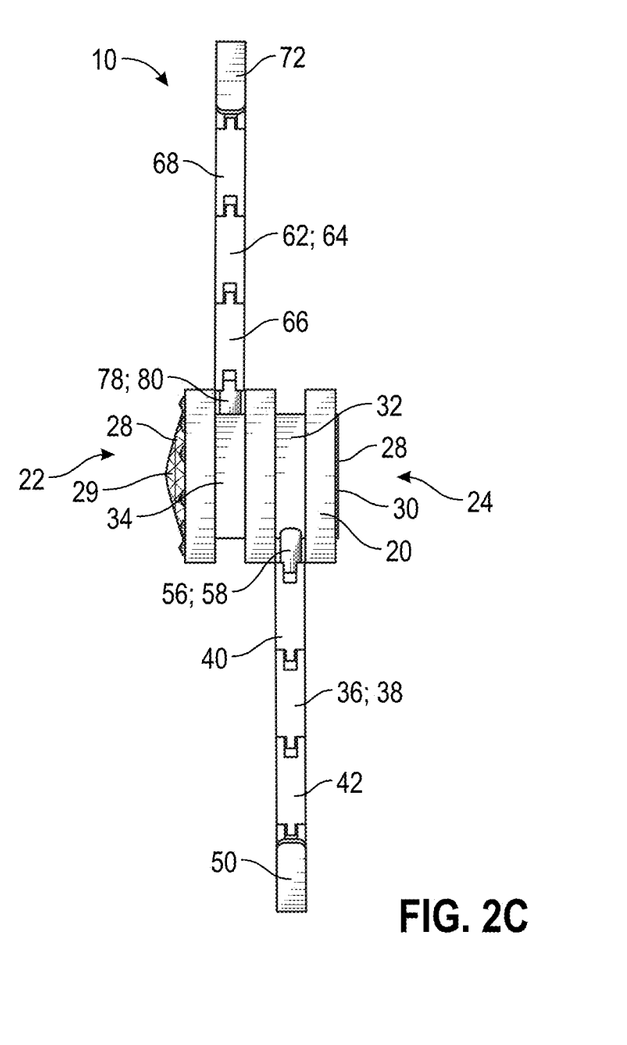

FIGS. 2A, 2B, and 2C show a perspective, front and side views, respectively of hook apparatus 10. Hook apparatus 10 provides housing 20. Housing 20 includes a base having a disk-shape structure. Housing 20 provides first end 22 and second end 24. First end 22 and second end 24 form a circular shape. First end 22 and second end 24 provides rim 26 at the periphery of housing 20. Rim 26 allows to form a centre area 28. Centre area 28 includes a decorative article 29 at first end 22. In one implementation, decorative article 29 provides a material made of gold, platinum, enamel, precious stone, etc. Moreover, the housing exterior may even provide an image of a loved one or scene that would be pleasing to the user. There are many ways the housing exterior may be adorned or form while the resulting structure being clearly within the scope of the presently disclosed and claimed subject matter. This allows the user to use the hook apparatus as a piece of jewellery or decorative accessory.

In such an implementation, decorative article 29 allows hook apparatus 10 for use as a piece of jewellery or decorative accessory. Further, centre area 28 includes a pad 30 at second end 24. Pad 30 may include a rigid or non-rigid structure made of any suitable material having non-skid properties. For example, pad 30 includes rubber or textured surface to frictionally engage a planar surface such as a table or wall. Alternatively, pad 30 includes a magnet that allows housing 20 to mount to a structure such as a metal structure, flat surface, etc. Rim 26 presents additional decorative indicia 31 at first end 22.

Housing 20 includes two cut sections i.e., first cut section 32 and second cut section 34. FIGS. 2A and 2C show first cut section 32 and second cut section 34 formed at the perimeter of housing 20. First cut section 32 may have a suitable depth and width to receive plurality of first links 36, first hook 50 and first connector 56. Similarly, second section 34 may have a suitable depth and width to receive plurality of second links 62, second hook 72, and second connector 78.

Hook apparatus 10 includes plurality of first links 36 that connect to each other in series. The plurality of first links 36 may be curved or arc-shape. In other words, each plurality of first links 36, in the circular embodiment, has a radius of curvature the same as remaining first links 36. However, this would not be true if the shape of the housing 20 were ovoid or otherwise shaped. The curvature of plurality of first links 36 allows to hold articles 14 in an operative configuration. Plurality of first links 36 forms first chain 38. First chain 38 includes starting link 40 and last link 42. Starting link 40 indicates a link closer to housing 20 in the operative configuration (FIGS. 2A, 2B, and 2C). In other words, the first link in the series of first chain 38 forms starting link 40. Last link 42 indicates a link far from housing 20 (FIGS. 2A, 2B, and 2C). Here, first chain 38 includes three links. However, a person skilled in the art may appreciate that the user may add or remove links 36 in the first chain 38 depending on the need.

Figure 2D:
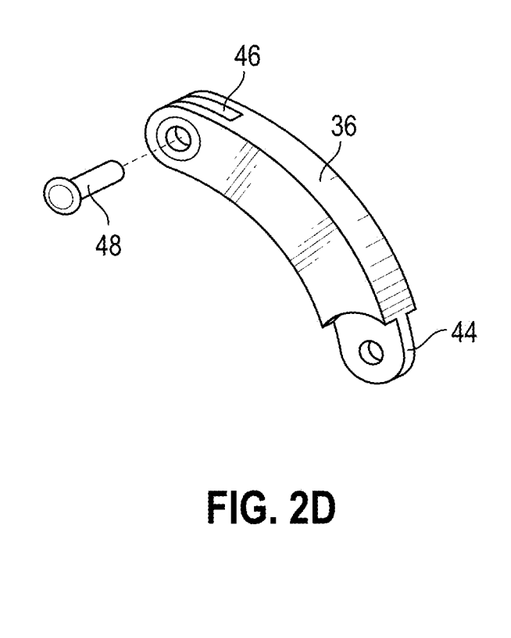
FIG. 2D illustrates a link, in accordance with one embodiment of the present invention.

FIG. 2D shows a perspective view of first link 36 from plurality of first links 36. First link 36 presents male member 44 and female member 46 configured to connect adjacent links in the first chain 38. Plurality of first links 36 connect to each other via first pin 48. First pin 48 connects male member 44 of first link 36 to female member 46 of adjacent link 36.

Plurality of first links 36 presents first hook 50. First hook 50 connects to last link 42 of the first chain 38. First Hook 50 has a concave inner surface to frictionally engage articles 14 such as a handbag. First hook 50 may have proximal end 52 and distal end 54. Proximal end 52 takes the shape of female member 46 and connects to male member 44 of last link 42. As may be seen from at least FIGS. 2A, 2B and 2C, first hook 50 has more length than each of plurality of first links 36. It may be noted that the subject matter shows first hook 50 may have different shapes and sizes than plurality of first links 36. However, a person skilled in the art may appreciate that the first hook 50 may be considered as the last link 42 of first chain 38. In such an implementation, first hook 50 becomes part of plurality of first links 36. The length of plurality of first links 36 and first hook 50 together be less than or equal to the perimeter of first cut section 32. Here, first cut section 32 encompasses plurality of first links 36 and first hook 50.

Hook apparatus 10 includes first connector 56 that extends from first cut section 32. FIGS. 2A and 2C show first connector 56 extending from first cut section 32. As may be seen, first connector 56 connects pivotally to starting link 40.

Hook apparatus 10 further includes plurality of second links 62 that connect to each other in series. Plurality of second links 62 has curved or arc-shape. Plurality of second links 62 forms second chain 64. Second chain 64 includes starting link 66 and last link 68 (similar to starting link 40 and last link 42 of first chain 38). Similar to first links 36, each of plurality of second links 62 provides a male member and a female member (not shown, similar to 44 and 46) to connect to adjacent links. Plurality of second links 62 connect via second pin 70. Plurality of second links 62 presents second hook 72. Second hook 72 connects to last link 68 of the second chain 64. Second hook 72 has a concave inner surface to frictionally connect to structure 12 such as a chair, door handle, back of the door, etc. Second hook 72 may have proximal end 74 and distal end 76. Proximal end 74 takes the shape of the female member and connects to the male member of last link 68. Hook apparatus 10 includes second connector 78 that extends from second cut section 34. Further, second connector 78 connects pivotally to starting link 66.

Figure 3A:
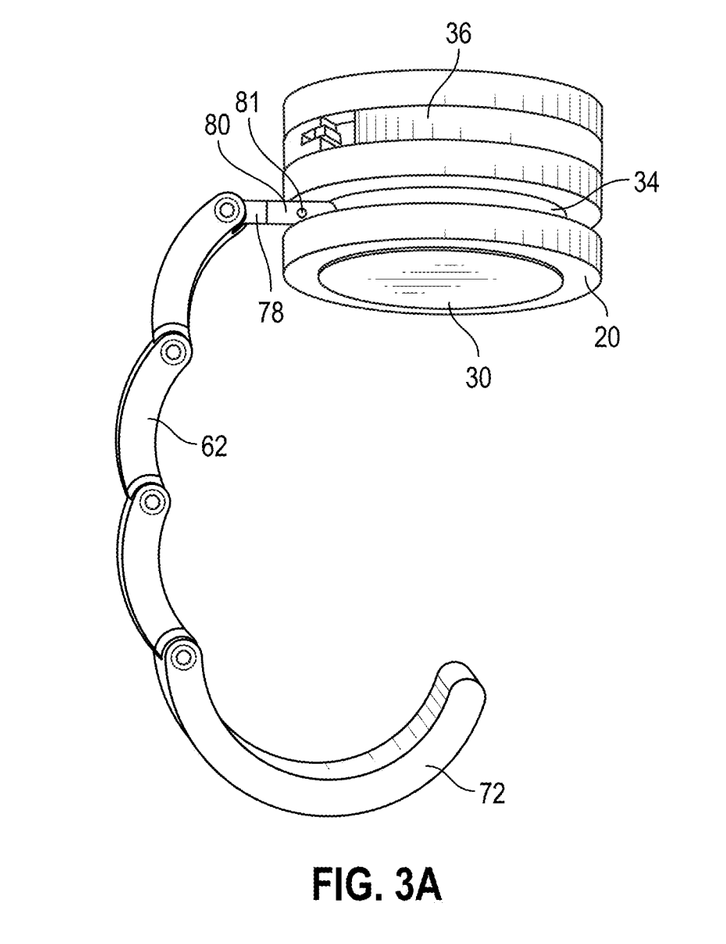
FIGS. 3A and 3B illustrate a feature of a connector in an extended and retracted position, respectively, in accordance with one embodiment of the present invention.
Figure 3B:
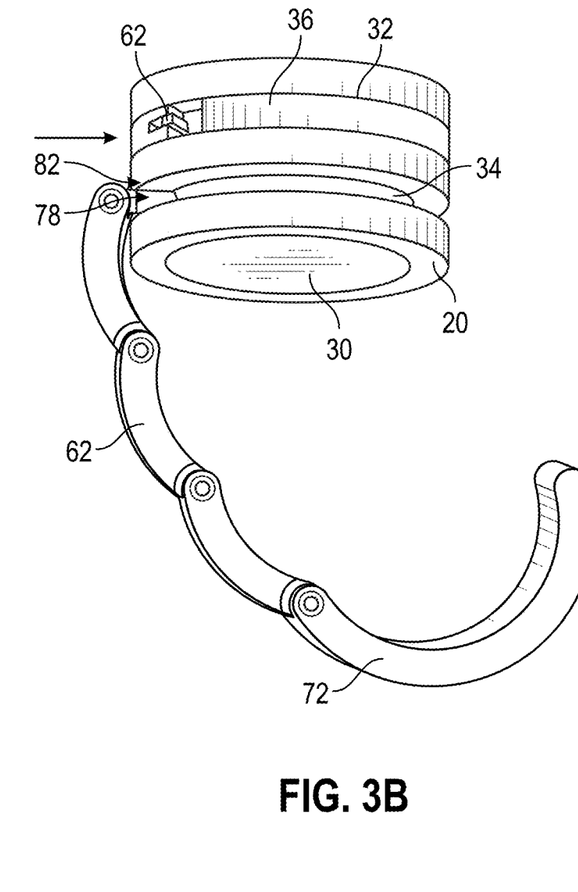

In the current embodiment, first connector 56 operates between an extended position 58 and a retracted position (similar to retracted position 82 of second connector 78 shown in FIG. 3B). Similarly, second connector 78 operates between an extended position 80 and a retracted position 82. FIG. 3A shows the feature of second connector 78 in extended position 80. Here, a portion of the length of second connector 78 extends from second cut section 34. Second connector 78 extends when plurality of second links 62 configure in the operative configuration.

In one example, second connector 78 includes a retention mechanism 81. Retention mechanism 81 may include, but not limited to, a hook-like structure, a magnet, and a button-like structure. Retention mechanism 81 may further provide a groove or similar structure for receiving an internal mechanism from the housing, where such mechanism or groove structure enables distribution of the weight from the purse or other item on the "J"-connected to the body of the housing. The material integrity of the housing, thus provides for weight bearing for the supported purse or other item, because such a groove in the metal would prevent slipping or detachment of the "J"-shaped connector from the housing. The groove and retention mechanistic 81 allow, therefore, the locking of second connector 78 in the retracted position.

Moreover, the housing has a groove or similar structure that supports this type of weight distribution structure, again relying upon the material integrity of the housing. The retention mechanism, thus, includes the pin which has a track or keyhole structure, such that when the pin is slid in to the track, the keyhole structure holds the pin in place. That is, the retention feature combines both the housing and the pin to retain the connector in place. The intention, therefore, is to restrict movement when the connector takes the "J"-shape. This provides a strong and secure configuration for holding the item of interest, i.e., a purse or other items. No come up for the present embodiment, the use of a groove or other mechanical means for securing the pin is preferable, as the strength of a magnet or other non-mechanical retention may not work as well. It is important to leverage the strength of the pin against the metal material of the housing for maximum retention force between the pin and the housing.

FIG. 3B shows the feature of second connector 78 in retracted position 82. Here, second connector 78 enters into a hole (not shown) in second cut section 34 and retention mechanism 81 extends to lock position of second connector 78. In one example, retention mechanism 81 holds second connector 78 in retracted position 82 by a magnetic force. In order to bring second connector 78 to extended position 80, a user pulls second connector 78, which disengages retention mechanism 81 and allows second connector 78 to extend from the hole as shown in FIG. 3A.

Figure 4A:
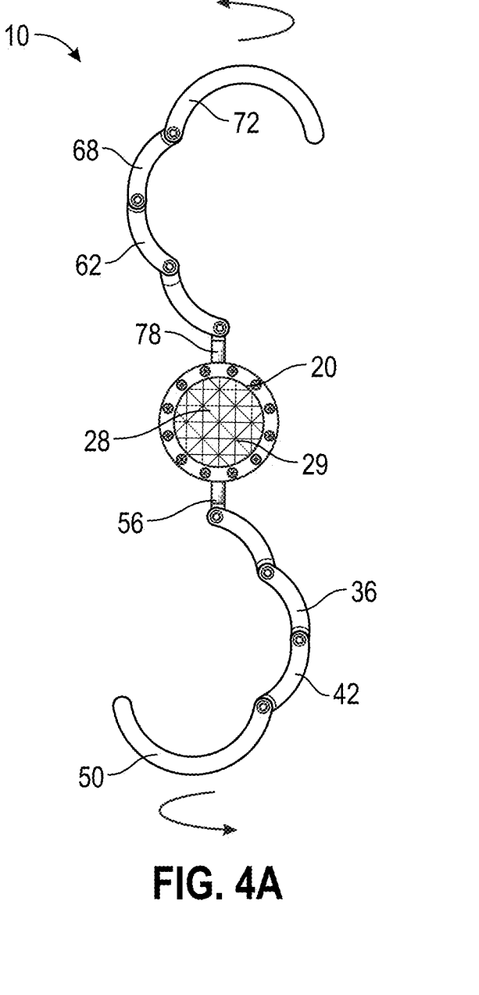
FIGS. 4A through 4C illustrate an operative configuration of hook apparatus, in accordance with one embodiment of the present invention.
Figure 4B:
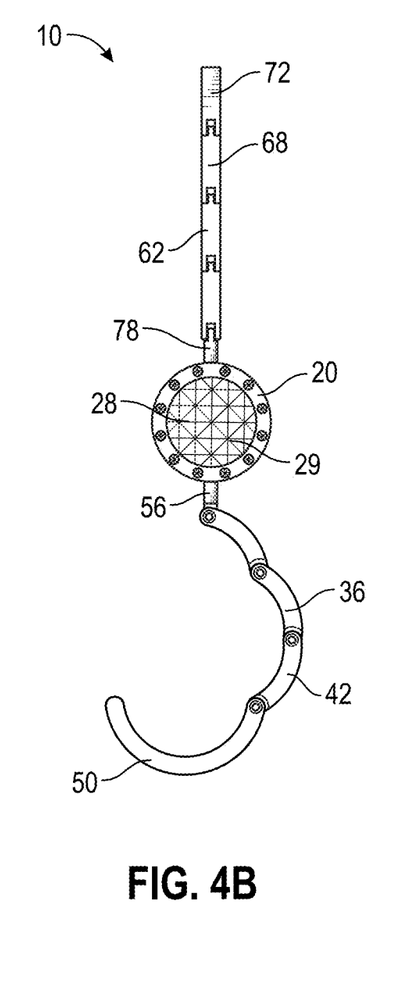
Figure 4C:
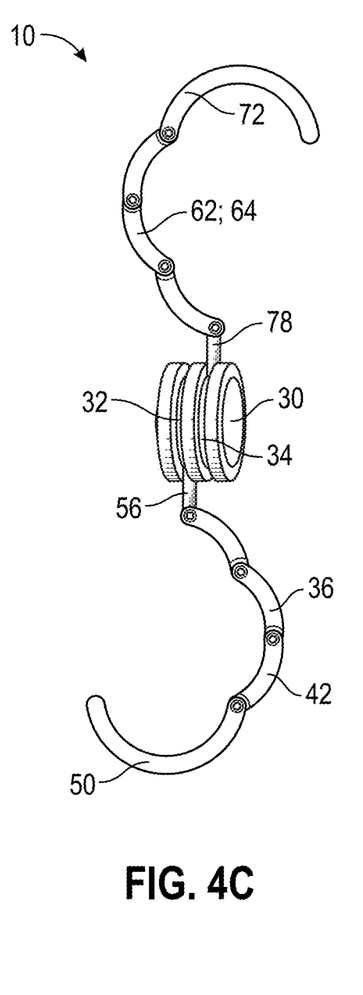

As specified above, hook apparatus 10 allows to hang articles 14 from different structures 12. FIGS. 4A through 4C show an operative configuration of hook apparatus 10. FIG. 4A shows plurality of first links 36 and plurality of second links 62 in an extended configuration. Here, first connector 56 adapts to extended position 58 and allows plurality of first links 36 and first hook 50 to extend. Similarly, second connector 78 adapts to extended position 80 and allows plurality of second links 62 and second hook 72 to extend. As may be seen from FIG. 4A, plurality of first links 36 and first hook 50, and plurality of second links 62 and second hook 72 face in opposite direction. As specified above, first connector 56 connects pivotally to starting link 40 of the plurality of first links 36. Similarly, second connector 78 connects pivotally to starting link 66 of the plurality of second links 62. As such, one or both of plurality of first links 36 and plurality of second links 62 turns or rotates approximately 90 degrees.

A person skilled in the art understands that either one or both of plurality of first links 36 and plurality of second links 62 may rotate freely in 360 degrees and is not limited to a 90 degree rotation. Rotating one or both of plurality of first links 36 and plurality of second links 62 allows to connect one hook to a structure such as a chair while another hook receives an article such as a hand bag. FIG. 4B shows a feature in which plurality of second links 62 turn or rotate approximately 90 degrees from its original position (FIG. 4A) while keeping plurality of first links 36 in its original position (FIG. 4A). FIG. 4C shows a side perspective of hook apparatus 10 shown in FIG. 4B. As may be seen, rotating plurality of second links 62 and retaining plurality of first links 36 in its position form an S-shape (S-shaped hook apparatus 10).

A person skilled in the art further understands that FIGS. 4B and 4C (and also FIG. 7) illustrate the feature of the S-shaped hook apparatus. S-shaped hook apparatus 10 mounts to a structure and allows the user to hang articles at the same time. FIG. 1 illustrates an exemplary embodiment of hook apparatus 10 connecting to structure 12 such as a chair and supporting article 14. As may be seen, second hook 72 connects to structure 12 and first hook 50 supports hanging of article 14. In the current example, article 14 hangs from first hook 50 with support from straps 16. However, it may be understood that article 14 may directly connect to first hook 50 and hang or suspend from first hook 50 without straps 16. Structure 12 may include, but not limited to, a chair, door handle, back of the door, planar surface such as a table, elongated rod of even or uneven shape, etc. Second hook 72 connects to smaller or uneven structure 12. As such, hook apparatus 10 allows to hang articles to structure 12 having even or uneven surface or different shape. Article 14 may include, but not limited to, handbags, clothing articles, umbrellas, shopping bags, coats, hats, small items, etc.

Figure 5:
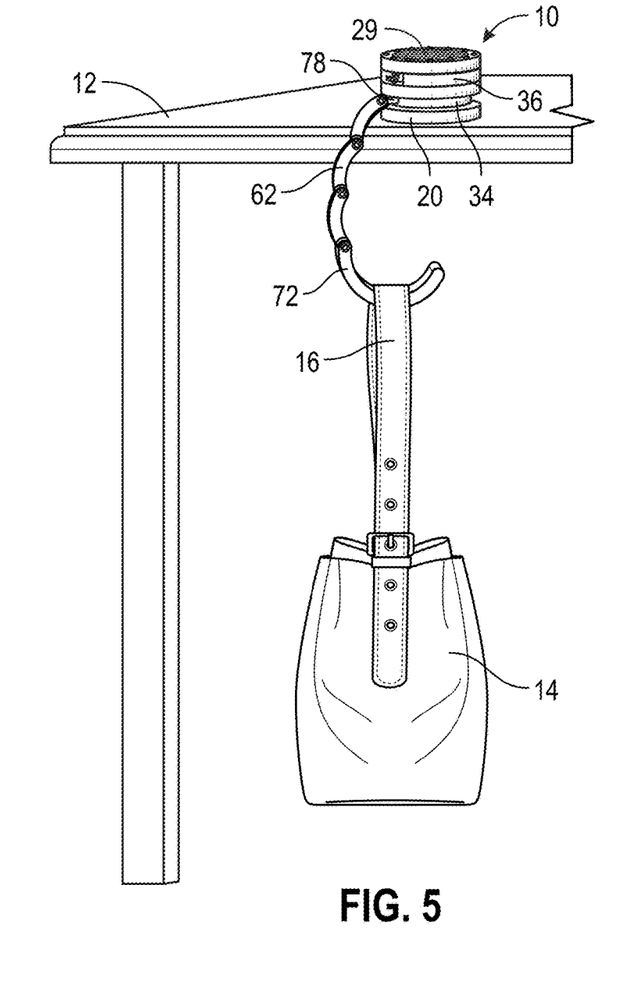
FIG. 5 illustrates a feature of housing adapted to rest on a table and an article configured to hang from the housing.

FIG. 5 shows a feature of hook apparatus 10 for hanging article 14 from structure 12 such as a table, in accordance with one exemplary embodiment of the present invention. In the current embodiment, first cut section 32 receives first hook 50 and plurality of first links 36. In other words, first hook 50, plurality of first links 36 and first connector 56 adapt a stored configuration. Further, plurality of second links 62, second hook 72 and second connector 78 extends to an operative configuration. Here, structure 12 i.e., table may have a planar surface. The user places housing 20 on structure 12. In the current embodiment, pad 30 rests on the planar surface of structure 12. Pad 30 frictionally engages the structure 12 and allows article 14 to hang underneath the structure 12 via second hook 72. As may be seen, second hook 72 extends downwardly below the structure 12 to support article 14.

Figure 6:
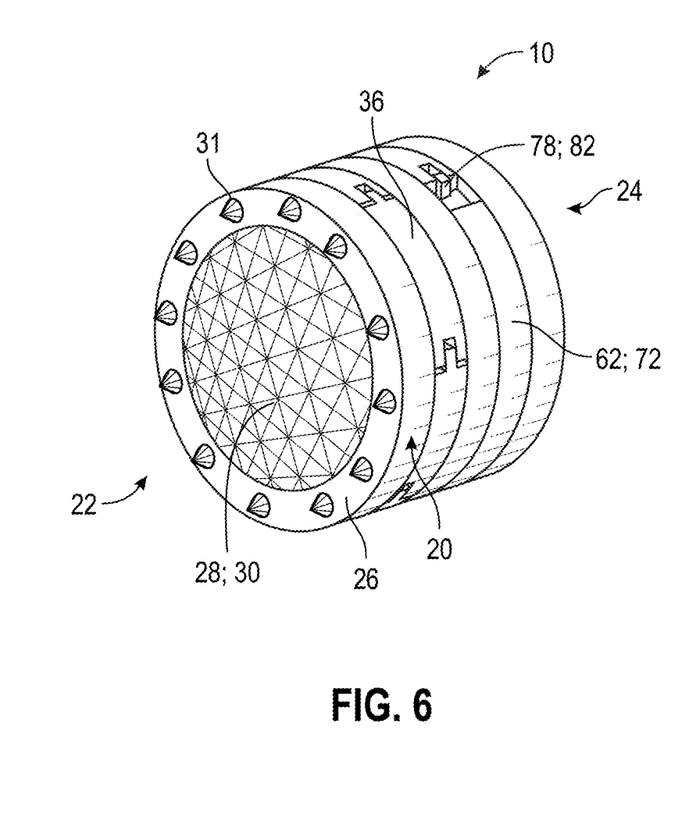
FIG. 6 illustrates the hook apparatus in a stored configuration, in accordance with one embodiment of the present invention.

FIG. 6 shows a perspective view of hook apparatus 10 in the stored configuration. It may be understood that hook apparatus 10 folds into the stored configuration when not in use. Plurality of first links 36, first hook 50, and first connector 56 fold and adapt for storage in first cut section 32. Further, plurality of second links 62, second hook 72, and second connector 78 fold and adapt for storage in second cut section 34. Upon folding into the stored configuration, the user may store hook apparatus 10 in article 14 such as a handbag, for example. In another example, the user may store hook apparatus 10 in his/her pocket of clothing wear. Hook apparatus 10 folds into a compact size and allows for easy carrying and storage. As the links and hooks fold into cut sections, hook apparatus 10 avoids damage to soft materials or other items when stored in the handbag 16.

Figure 7:
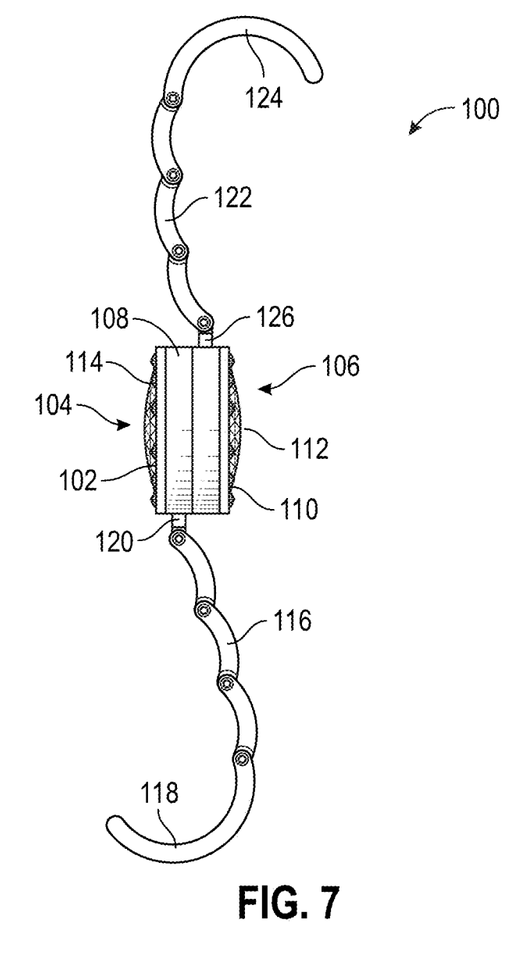
FIG. 7 illustrates a perspective view of the hook apparatus, in accordance with another embodiment of the present invention.

FIG. 7 shows a side perspective view of hook apparatus 100, in accordance with another embodiment of the present subject matter. Hook apparatus 100 includes housing 102. Housing 102 has a disk-shape structure. Housing 102 provides first end 104 and second end 106. Housing 102 presents first part 108 connecting to second part 110. Each of first part 108 and second part 110 has a pad 112. In the current embodiment, pad 112 on both sides allows housing 102 to mount to any structure from any side (as opposed to decorative article 29 on one end and pad 30 on other end which allow mounting by pad 30 only as shown in FIGS. 2C and 5).

In the current embodiment, housing 102 includes perimeter or peripheral edge 114 (outer surface of housing's disk-shape structure). Hook apparatus 100 includes plurality of first links 116 that connect to first hook 118. Plurality of first links 116 may have similar shape and size to that of plurality of first links 36, as explained above. First hook 118 may have similar shape and size to that of first hook 50. First part 108 presents first connector 120. First connector 120 extends from perimeter 114 operates between a retracted position and an extended position similar to first connector 56 (FIG. 2B).

Further, hook apparatus 100 includes plurality of second links 122 that connect to second hook 124. Plurality of second links 122 may have similar shape and size to that of plurality of second links 62. Second hook 124 may have similar shape and size to that of second hook 72. Plurality of second links 122 include second connector 126 that extends from perimeter 114 of second part 110. Second connector 126 operates similar to second connector 78.

Figure 8:
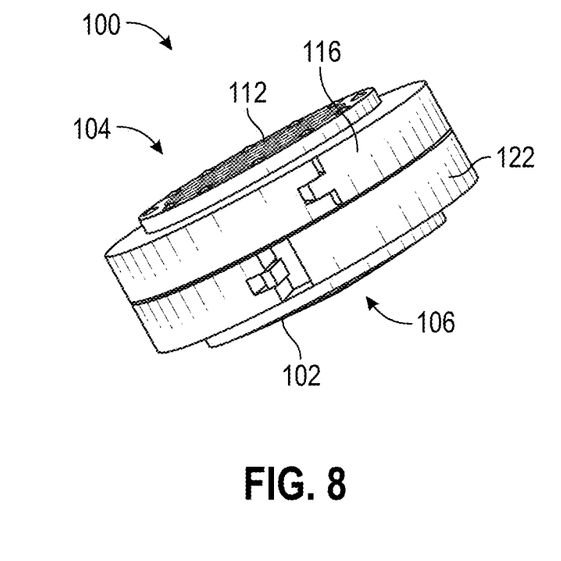
FIG. 8 illustrates the hook apparatus in a stored configuration, in accordance with another embodiment of the present invention.

As may be seen from at least FIGS. 2C and 7, hook apparatus 10 includes cut sections 32; 34 at housing 20 and hook apparatus 100 includes curved perimeter 114 (without cut-sections). In other words, perimeter 114 of hook apparatus 100 includes a smooth curved or a circular body. Here, connectors extend from the perimeter/circular body of the housing. Links, hooks, and connectors may have the same shape, size, and operative features. In the current embodiment, connectors 120; 126 retract and allow the links and hooks to fold adjacent to perimeter 114. FIG. 8 shows a perspective view of hook apparatus 100 in a stored configuration. The user may extend links and hooks of hook apparatus 100 to connect to structure 10 and hang articles 14 (as shown in FIG. 1).

FIGUREs illustrate housing 20 in a disk-shape. However, a person skilled in the art may appreciate that housing 20 may have a different shape such as hexagon, square, octagon, etc. In such an implementation, links may have suitable shape and size to fold adjacent to the perimeter of housing or into the cut sections. Lightweight material may be selected to construct hook apparatus as portable and discrete as possible. Components of hook apparatus such as housing, links, hook and connector may be made of metal, plastic or any other suitable rigid material. Alternatively, links and hook may be made of a strip of material such as synthetic material, rubber or any other suitable material for easy folding of links and hook. Hook apparatus may be made in suitable sizes for easy carrying and transport.

In addition to the above description, the disclosed subject matter may further provide an enhancement to the hook apparatus. For example, by adding a retention device or clip with the housing, for example, the hook apparatus may be attached on the exterior of a bag, coat, purse strap, or other item. The presently disclosed hook apparatus can be positioned for ready use. Because the most likely use is in conjunction with a purse, having the ability to attach to a purse strap is particularly beneficial. These uses would prevent the hook apparatus from being placed in the bottom of a purse. Thus, the hook apparatus and the associated clip or retention device may be deemed an ornament or enhancement in the appearance of the purse. This would facilitate use the hook apparatus in a number of situations and cause it to be considered an even more attractive addition to a purse or handbag.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort might be complex and time consuming, but may nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims may not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. An articulating hook apparatus for hanging an article from a structure, said hook apparatus comprising:
   a housing;
   a plurality of first links that connect in series, said plurality of first links comprises a starting link and a last link;
   a first hook, said first hook mounts to the last link of said plurality of first links;

a first connector, said first connector extends from said housing, said first connector pivotally mounts to said starting link of said plurality of first links;
a plurality of second links that connect in series, said plurality of second links comprises a starting link and a last link;
a second hook, said second hook mounts to the last link of said plurality of second links; and
a second connector, said second connector extends from said housing, said second connector pivotally mounts to said starting link of said plurality of second links,
wherein said first connector and said second connector mount at opposite sides of said housing,
wherein each of said first connector and said second connector operates between a retracted position and an extended position,
wherein said first connector and said second connector retract, and allow said plurality of first links, said first hook, said plurality of second links and said second hook to fold adjacent to the perimeter of housing,
wherein said first connector and said second connector extend, and allow said plurality of first links, said first hook, said plurality of second links and said second hook to extend, and wherein an article connects to said first hook and said second hook connects to a structure thereby allowing the article to hang from the structure,
wherein said housing comprises a first cut section and a second cut section,
wherein said first connector extends from the first cut section and said second connector extends from the second cut section,
wherein said first connector retracts and allows said plurality of first links and said first hook to fold inside the first cut section,
wherein said first connector, said first links, and said first hook, and said second connector, said second hook, and said second hook extend to form an S-shaped hook apparatus,
wherein said second connector, said second hook, and said second hook retract into said second cut section and said first connector, said first links, and said first hook extend to form a J-shaped hook apparatus, and
wherein said second connector comprises a retention mechanism to lock said second connector in said J-shaped hook apparatus.

2. The hook apparatus of claim 1, wherein said housing has a disk-shape.

3. The hook apparatus of claim 1, wherein J-shaped hook apparatus allows to hang the article from the structure having a-vertical of horizontal configuration.

4. The hook apparatus of claim 1, wherein the length of said plurality of first links and said first hook match the perimeter of the first cut section.

5. The hook apparatus of claim 1, wherein said second connector retracts and allows said plurality of second links and said second hook to fold inside the second cut section.

6. The hook apparatus of claim 5, wherein the length of said plurality of second links and said second hook match the perimeter of the second cut section.

7. The hook apparatus of claim 1, wherein said plurality of first links pivot relative to one another.

8. The hook apparatus of claim 7, wherein each of said plurality of first links has a radius of curvature same as remaining first links.

9. The hook apparatus of claim 1, wherein said first hook pivotally connects to the last link of said plurality of first links.

10. The hook apparatus of claim 1, wherein said plurality of second links pivot relative to one another.

11. The hook apparatus of claim 1, wherein said second hook pivotally connects to the last link of said plurality of second links.

12. An articulating hook apparatus for hanging an article from a structure, said hook apparatus comprising:
a housing having a disk-shape, said housing comprises a first cut section and a second cut section;
a plurality of first links that connect in series, wherein said plurality of first links comprises a starting link and a last link;
a first hook, said first hook pivotally connects to the last link of said plurality of first links;
a first connector, said first connector extends from said first cut section, said first connector pivotally mounts to said starting link of said plurality of first links;
a plurality of second links that connect in series, said plurality of second links comprises a starting link and a last link;
a second hook, said second hook pivotally connects the last link of said plurality of second links; and
a second connector, said second connector extends from said second cut section, said second connector pivotally mounts to said starting link of said plurality of second links,
wherein said first connector and said second connector mount at opposite sides of said housing,
wherein each of said first connector and said second connector operates between a retracted position and an extended position,
wherein said first connector and said second connector retract, and allow said plurality of first links, said first hook, said plurality of second links and said second hook to fold in the first cut section and the second cut section, respectively,
wherein said first connector and said second connector extend, and allow said plurality of first links, said first hook, said plurality of second links and said second hook to extend, and wherein an article connects to said first hook and said second hook connects to a structure thereby allowing the article to hang from the structure,
wherein said first connector, said first links, and said first hook, and said second connector, said second hook, and said second hook extend to form an S-shaped hook apparatus,
wherein said second connector, said second hook, said second hook retract into said second cut section and said first connector, said first links, said first hook extend to form a J-shaped hook apparatus, and
wherein said second connector comprises a retention mechanism to lock said second connector in said J-shaped hook apparatus.

13. The hook apparatus of claim 12, wherein said second connector retracts and allows said plurality of second links and said second hook to fold into the second cut section, wherein said housing adapts to rest on a planar surface and allows the article to hang from said first hook.

14. The hook apparatus of claim 12, J-shaped hook apparatus allows to hang the article from the structure having a-vertical of horizontal configuration.

15. A method of hanging an article from a structure, said method comprising:
providing a housing having a disk-shape, said housing comprising a first cut section and a second cut section;

providing a plurality of first links connecting each other in series, said plurality of first links comprising a starting link and a last link;

providing a first hook configured for pivotally connecting the last link of said plurality of first links;

providing a first connector extending from said first cut section, said first connector configured for pivotally mounting said starting link of said plurality of first links;

providing a plurality of second links connecting each other in series, said plurality of second links comprising a starting link and a last link;

providing a second hook configured for pivotally connecting the last link of said plurality of second links;

providing a second connector extending from said second cut section, said second connector configured for pivotally mounting to said starting link of said plurality of second links;

configuring each of said first connector and said second connector for operating between a retracted position and an extended position;

retracting said first connector and said second connector for allowing said plurality of first links, said first hook, said plurality of second links and said second hook to fold in the first cut section and the second cut section, respectively; and extending said first connector and said second connector for allowing said plurality of first links, said first hook, said plurality of second links and said second hook, for connecting the second hook to a structure and hanging an article to the first hook;

forming an S-shaped hook apparatus by extending said first connector, said first links, and said first hook, and said second connector, said second hook, and said second hook;

forming a J-shaped hook apparatus by retracting said second connector, said second hook, and said second hook into said second cut section, and extending said first connector, said first links, and said first hook; and providing a retention mechanism at said second connector to lock said second connector in said J-shaped hook apparatus.

* * * * *